United States Patent
Ota et al.

(10) Patent No.: US 6,808,547 B2
(45) Date of Patent: Oct. 26, 2004

(54) AIR CLEANER

(75) Inventors: Hiromi Ota, Hamakita (JP); Katsuyuki Ezuka, Hamakita (JP)

(73) Assignee: Toyo Roki Seizo Kabushiki Kaisha, Shizuoka-ken (JP)

( * ) Notice: Subject to any disclaimer, the term of this patent is extended or adjusted under 35 U.S.C. 154(b) by 72 days.

(21) Appl. No.: 10/300,646

(22) Filed: Nov. 21, 2002

(65) Prior Publication Data

US 2004/0020177 A1 Feb. 5, 2004

(30) Foreign Application Priority Data

Jul. 31, 2002 (JP) ........................................ 2002-223378

(51) Int. Cl.[7] .............................................. B01D 46/10
(52) U.S. Cl. ............................. 55/478; 55/480; 55/481; 55/497; 55/502; 55/503
(58) Field of Search ................................ 55/385.3, 480, 55/481, 497, 502, 503, 506, 478; 123/198 E

(56) References Cited

U.S. PATENT DOCUMENTS

| | | | |
|---|---|---|---|
| 3,830,042 A | * | 8/1974 | MacDonnell ................ 55/480 |
| 3,993,464 A | * | 11/1976 | Pelabon ........................ 55/480 |
| 4,018,580 A | * | 4/1977 | Burkholz et al. ............. 55/481 |
| 4,773,922 A | * | 9/1988 | Ross et al. .................... 55/481 |
| 5,030,264 A | * | 7/1991 | Klotz et al. ................... 55/481 |
| 5,125,941 A | * | 6/1992 | Ernst et al. ................... 55/480 |
| 5,379,506 A | * | 1/1995 | Park ............................. 55/493 |
| 5,740,774 A | * | 4/1998 | Kennedy ................ 123/198 E |
| 6,585,792 B2 | * | 7/2003 | Schneider et al. ............ 55/481 |

FOREIGN PATENT DOCUMENTS

JP          9-122417          5/1997

* cited by examiner

Primary Examiner—Duane Smith
Assistant Examiner—Jason M. Greene
(74) Attorney, Agent, or Firm—Young & Thompson

(57) ABSTRACT

An air cleaner comprises a filter element, for filtrating air, including a frame structure, a case provided with an opening through which the filter element is inserted into the case and having an abutment surface to which the seal portion of the filter element contacts, and a holder provided with a lid portion closing the opening of the case when fitted to the case. The filter element is first inserted into the case and the holder is thereafter fitted into the case so as to contact the seal portion of the filter element to the abutment surface of the case.

17 Claims, 14 Drawing Sheets

PRIOR ART

AIR CLEANER

BACKGROUND OF THE INVENTION

1. Field of the Invention

The present invention relates to an air cleaner for filtering an air taken inside an internal combustion engine of a vehicle.

2. Related Art

There is known an air cleaner of this kind in which an air cleaner case is arranged on the way of an intake duct arrangement of an internal combustion engine of a vehicle so that a filter element is detachably mounted in the case even at a time when the internal combustion engine is driven. For example, Japanese Patent Laid-open (KOKAI) Publication No. 122417/1997 discloses, such as shown in FIG. 18, an air cleaner having a case 1 through which air passes, and the case 1 is formed, at its side wall 1a, with an opening 2, into which a filter unit 3 is detachably mounted. The filter unit 3 is composed of two parts, that is, a filter element 4 and a holder 5 to which the filter element 4 is fitted.

The holder 5 comprises a lid member 5a closing the opening 2 formed on the case 1 and a holder frame 5b having a projection (protrusion) 6 formed at its lower end portion as viewed in FIG. 18, and the filter element 4 is accommodated in this holder frame 5b. On the other hand, the case 1 is formed with a groove 1b to be engageable with the projection 6 of the holder 5. That is, the filter unit 3 is inserted into the case 1 through the opening 2 and the projection 6 is then fitted to the groove 1b. The filter element 4 is provided with a packing 7 for sealing, and when the filter element 3 is rotated about the projection 6 as being a fulcrum, the packing 7 of the filter element 4 contacts an abutment surface 1c of the case, thus sealing a portion between the case 1 and the filter element 4.

In the air cleaner disclosed in the above prior art reference of Japanese Patent Laid-open Publication No. 122417/1997, as the filter unit 3 is rotated about the projection 6 as the fulcrum for rotation, a force of the packing 7 pushing the abutment surface 1c of the case 1 differs in accordance with a distance from the fulcrum, and therefore, even sealing performance cannot be achieved between the case 1 and the filter element 4. Furthermore, a packing may be disposed to the lower surface of the lid member 5a of the holder 5 for preventing water from invading inside the case 1. In such case, however, when the filter element 3 is inserted and rotated repeatedly, there may cause a case of peeling off the packing, thus being inconvenient.

SUMMARY OF THE INVENTION

The present invention was therefore conceived to substantially eliminate the defects or inconveniences encountered in the prior art mentioned above and provide an air cleaner in which two parts of a filter element and a holder are inserted and assembled detachably to a case of the air cleaner while maintaining a desirable sealing performance between the case and the filter element.

This and other objects can be achieved according to the present invention by providing an air cleaner which comprises:

a filter element, for filtrating air, including a frame structure, a filtrating member disposed in the frame structure, a flanged portion protruding from the outside of the frame structure and a seal portion;

a case provided with an air passage through which air passes and an opening through which the filter element is inserted into the case and having an abutment surface around the air passage to which the seal portion of the filter element contacts, the case being further provided with a guide portion for guiding the flanged portion of the filter element when inserted into the case through the opening and positioning the filter element in the air flow direction with respect to the case; and a holder provided with a lid portion closing the opening of the case when fitted to the case and a wedged portion to be inserted between the case and the filter element, wherein the filter element is first inserted into the case through the opening thereof and the holder is thereafter fitted into the case through the opening to thereby contact the seal portion of the filter element to the abutment surface of the case.

According to this structure, the filter element is first inserted into the case and then positioned, and thereafter, the holder is fitted into the case so as to contact the seal portion of the filter element to the abutment surface of the case, thus maintaining a good sealing performance.

Furthermore, in a preferred embodiment of the present invention, the guide portion is provided with a stepped portion formed on the opening of the case so as to surround the flanged portion of the filter element, the stepped portion extending in a filter element inserting direction from the opening towards an interior of the case.

The opening has a rectangular shape and the guide portion may comprise a plurality of ribs arranged inside the case along a filter element inserting direction. Other positioning ribs may be adapted to position the filter element, when inserted into the case through the opening, in the filter element inserting direction and to prevent an entire length of one side of the frame of the filter element from contacting to the case.

The frame structure of the filter element is formed with an inclination surface inclining with respect to the seal portion so as to be apart from the seal portion towards the inside of the case from the opening thereof, the case is formed with a holder guide surface to be parallel to the abutment surface of the case, the wedge portion of the holder is formed with an inclination surface inclining with respect to the holder guide surface so as to approach the holder guide surface towards the inside of the case from the opening, and the seal portion of the filter element abuts against the abutment surface of the case by contact of the inclination surface of the wedge portion of the holder with the inclination surface of the frame structure of the filter element.

Furthermore, the frame structure of the filter element may be formed with an end surface in parallel to the seal portion of the filter element, the case is formed with a holder guide surface inclining with respect to the abutment surface so as to approach the abutment surface towards the inside of the case from the opening thereof, the wedge portion of the holder is formed with an inclination surface inclining with respect to the abutment surface of the case so as to approach the abutment surface towards the inside of the case from the opening, and the seal portion of the filter element abuts against the abutment surface of the case by contact of the inclination surface of the wedge portion of the holder with the holder guide surface of the case.

The case will be composed of two case half parts, each in shape of an opened box, which can be joined together to form the case, the opening being formed at the joining portion and the case half parts being provided with air flow-in port and air flow-out port, respectively, so that air flows in a direction substantially normal to the filter element insertion direction. The abutment surface is formed on an opened end surface of one of these two half case parts in a flanged frame shape.

The wedge portion of the holder comprises a pair of wedge sections and a plate member connecting edge portions of the paired wedge sections.

According to these preferred embodiments, the location of the positioning ribs will make possible the easy positioning of the filter element and prevent the contacting of the entire length of the side of the frame structure of the filter element to thereby realize a uniform contacting of the seal portion of the filter element to the abutment surface of the case.

The formation of the inclination surfaces on the frame structure of the filter element and the wedge portion of the holder makes it possible to easily contact the seal portion of the filter element with the abutment surface of the case by fitting the holder into the case.

The nature and further characteristic features of the present invention will be made more clear from the following descriptions made with reference to the accompanying drawings.

DESCRIPTION OF THE PREFERRED EMBODIMENTS

Figure 1:
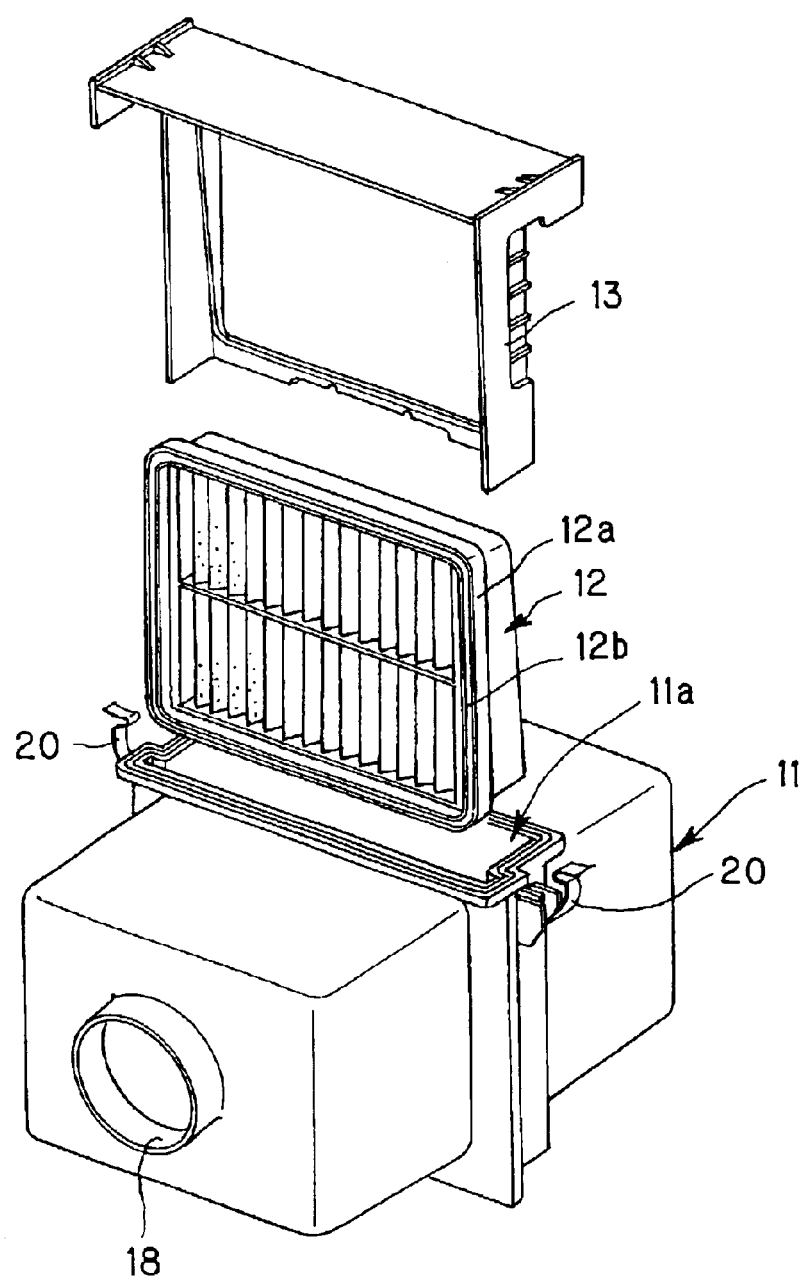
FIG. 1 is a developed perspective view showing an air cleaner according to a first embodiment of the present invention.

FIG. 1 is a developed perspective view of an air cleaner according to the first embodiment of the present invention, and this air cleaner is incorporated in an intake system for feeding air to an internal combustion engine of a vehicle so as to filtrate the air. The air cleaner comprises a case 11, a filter element 12 and a holder 13 which are inserted into an opening 11a formed on the case 11.

Figure 2:
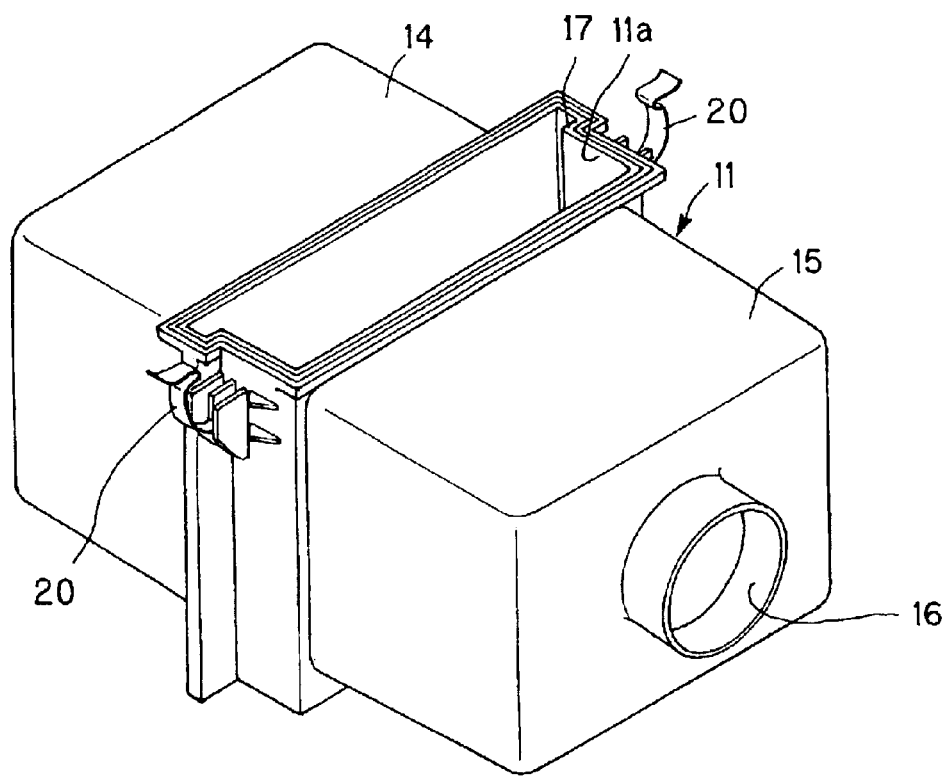
FIG. 2 is a perspective view showing a case of the air cleaner.
Figure 3:
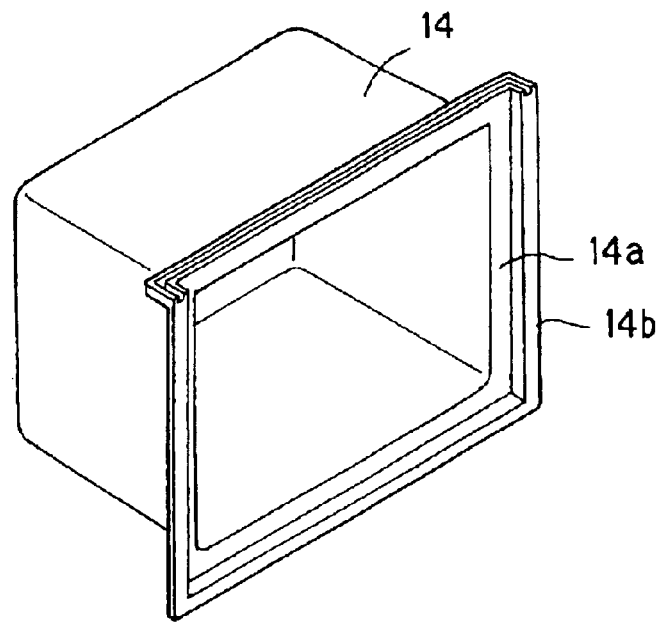
FIG. 3 is a perspective view showing a case half part on a clean side.
Figure 4:
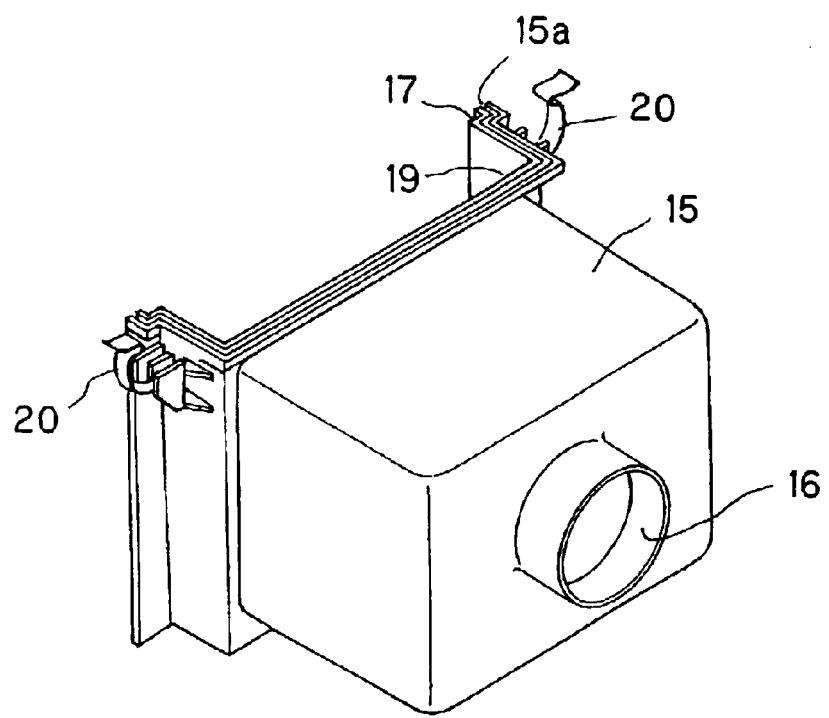
FIG. 4 is a perspective view showing a case half part on a dirty side.

With reference to FIGS. 2 to 4 showing perspective views of the case 11, the case 11 is formed from a pair of case half parts 14 and 15, which are joined together into approximately rectangular box shape. The case halves 14 and 15 are products of resin material and joined, for example, by means of oscillation fusing process. The case 11 are formed, at its both end walls, with a flow-in port 16 (FIG. 2) communicating with atmosphere and a flow-out port 18 (FIG. 1) communicating an internal combustion engine of a vehicle. That is, these flow-in and flow-out ports 16 and 18 are formed on the opposing wall sections of the case halves 15 and 14, respectively, so that the air flows from the flow-in port 16 towards the flow-out port 18 in the case 11. The case 11 is formed, at its side (upper as viewed) wall section with the opening 11a through which the filter element 12 and the holder 13 are inserted into the case 11. Thus, the filter element 12 is inserted into the case 11 in a direction approximately perpendicular to the air flow direction (from the upper side to the downside as viewed in FIG. 1). Further, according to a layout of the flow-in port 16 and the flow-out port 18, the filter element inserting direction may not be perpendicular to the air-flow direction.

The opening 11a formed on the case 11 has a rectangular shape in its plan view and a portion of the case 11 surrounding the opening 11a has a stepped portion 17 in lateral width in the longitudinal direction of the opening 11a. This stepped portion 17 extends, towards the inside of the case 11 from the opening 11a, in a direction along which the filter element 12 is inserted, and the stepped portion 17 therefore acts as a guide section for guiding a flanged portion 12a of the filter element 12 to be slidable, which will be described in detail hereinlater.

FIGS. 3 and 4 show the case halves, i.e. case half parts 14 and 15. The clean side case part 14 is formed with a flanged abutting surface 14a in form of frame around air-flow path. This abutting surface 14a contacts a seal portion of the filter element 12 to thereby achieve the sealing between the filter element 11 and the case 11. A joining portion 14b is formed on three sides of the abutting surface 14a, except for one side on which the opening 11a is formed, so as to extend towards the other case half 15, i.e. dirty side case part, and the end surface of this joining portion 14b is fused to the dirty side case part 15. That is, in such clean side case part 14, there is formed one stepped portion (i.e. abutting surface 14a) from the end surface thereof towards the flow-out port of the case part 14.

On the other hand, the case half part 15 is formed with an end surface 15a to three sides, except for one side (opening 11a side) to be fused to the clean side case part 14. Different from the clean side case part 14, two stepped portions 17 and 19 are formed from this end surface 15a towards the flow-in port 16 of the case part 15 (see FIG. 9). One 17 of these two stepped portions 17 and 19 acts as the guide portion for guiding the flanged portion 12a of the filter element 12 as mentioned before and the other one 19 thereof acts a holder guide surface 19 for guiding the holder 13 to be inserted into the case 11 through the opening 11a. The holder guide surface 19 is formed to be parallel to the abutting surface 14a of the clean side case part 14. The holder 13 inserted into the case 11 through the opening 11a is fastened by fastening fittings 20, 20 attached to the dirty side case part 15.

Figure 5:
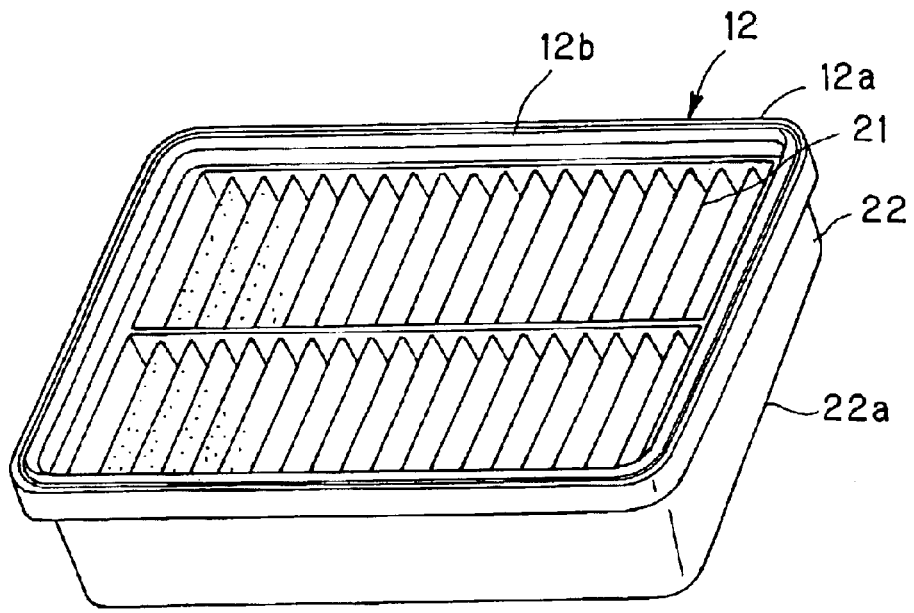
FIG. 5 is a perspective view showing a filter element.
Figure 6:
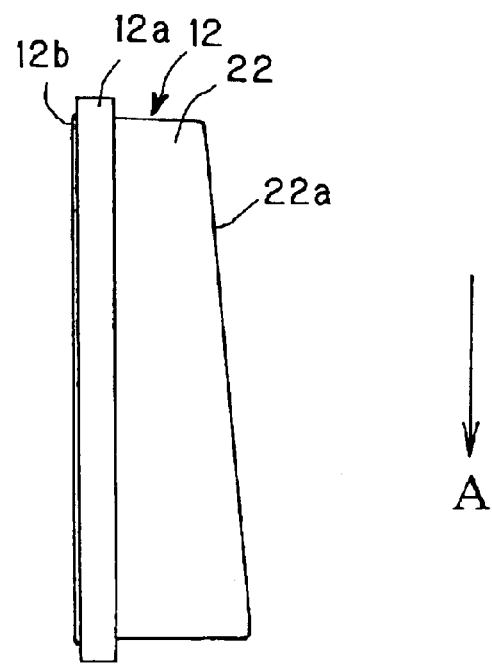
FIG. 6 is a side view of the filter element.

The filter element 12 is shown in FIGS. 5 and 6.

With reference to FIGS. 5 and 6, the filter element 12 comprises a filtrating member 21 folded in shape of bellows and a frame 22 disposed so as to surround the filtrating member 21. The frame 22 is, for example, manufactured through an injection molding of resin material with the filtrating member 21 being inserted. The flanged portion 12a, mentioned before, is formed on one end portion of the frame 22 so as to protrude from the outside of the frame 22 and a seal portion 12b to contact the abutting surface 14a of the case 11 is formed on the end surface of this flanged portion 12a. The seal portion 12b is formed on the whole periphery of the filtrating member 21 within the same plane.

As shown in FIG. 6, the frame 22 of the filter element 12 has a frame inclination surface 22a which inclines with respect to the seal portion 12b so as to be gradually apart from the seal portion 12b towards an arrow direction A along which the filter element 12 is inserted. Further, the filtrating member 21 may be formed from various materials, such as nonwoven fabric, filter paper or like, having various shapes such as flat plate as well as bellows shape.

Figure 7:
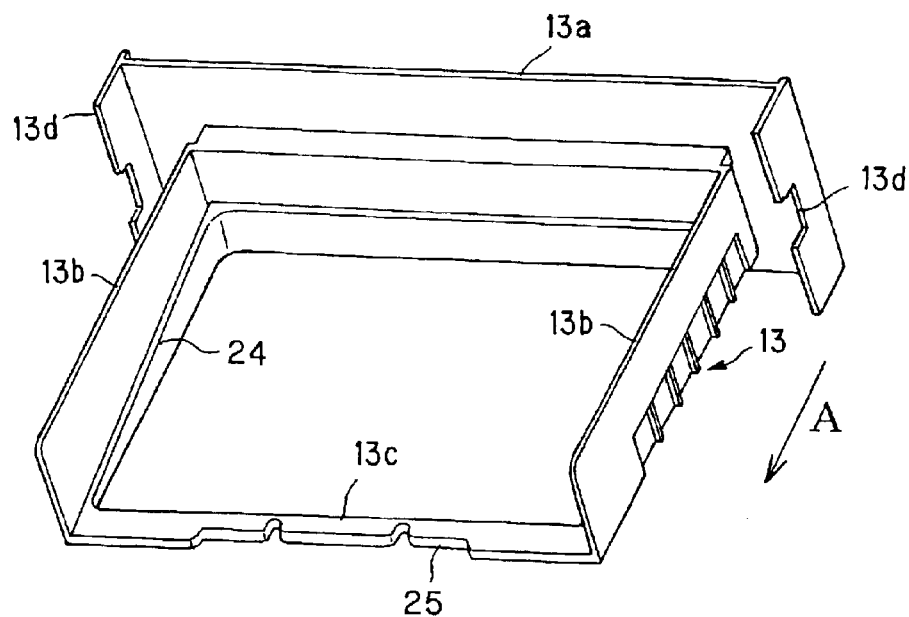
FIG. 7 is a perspective view showing a holder.
Figure 8:
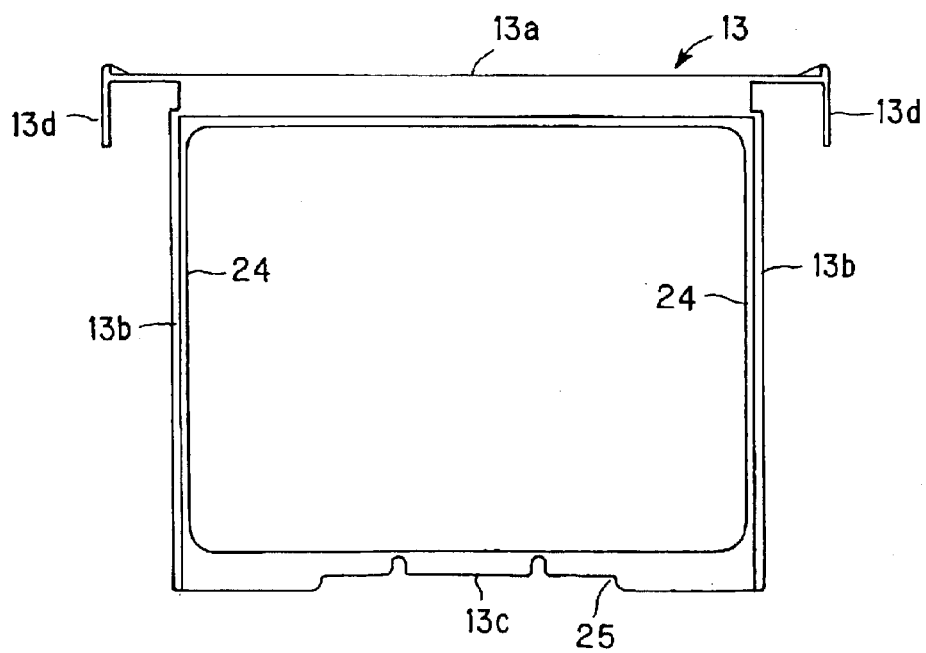
FIG. 8 is a front view of the holder.

FIGS. 7 and 8 show the holder 13. The holder 13 comprises a lid portion 13a closing the opening 11a of the case 11, a pair of wedge portions (wedge-shaped portions) 13b, 13b extending perpendicularly from the lid portion 13a so as to be inserted into a space between the case 11 and the filter element 12, and a bottom portion 13c connecting lower edges (FIG. 7) of the wedge portions 13b, 13b.

The lid portion 13a has a rectangular shape suitable for covering the entire area of the opening 11a of the case and is provided with folded portions 13d, 13d at both ends in its width direction. The wedge portions 13b, 13b are formed with inclination surfaces 24, 24 inclined with respect to a holding guide surface 19 (FIG. 9) of the case 11 along the holder insertion direction A (inward of the case 11 from the case opening 11a). These wedge portion inclination surfaces 24, 24 are formed by forming stepped portions on the inside portions of the wedge portions 13b, 13b, respectively.

Furthermore, the bottom portion 13c is formed with a cutout 25 for positioning the holder 13 in its inserting direction. The holder 13 is positioned by a stepped portion 19 in a width direction as shown in FIG. 9.

Figure 9:
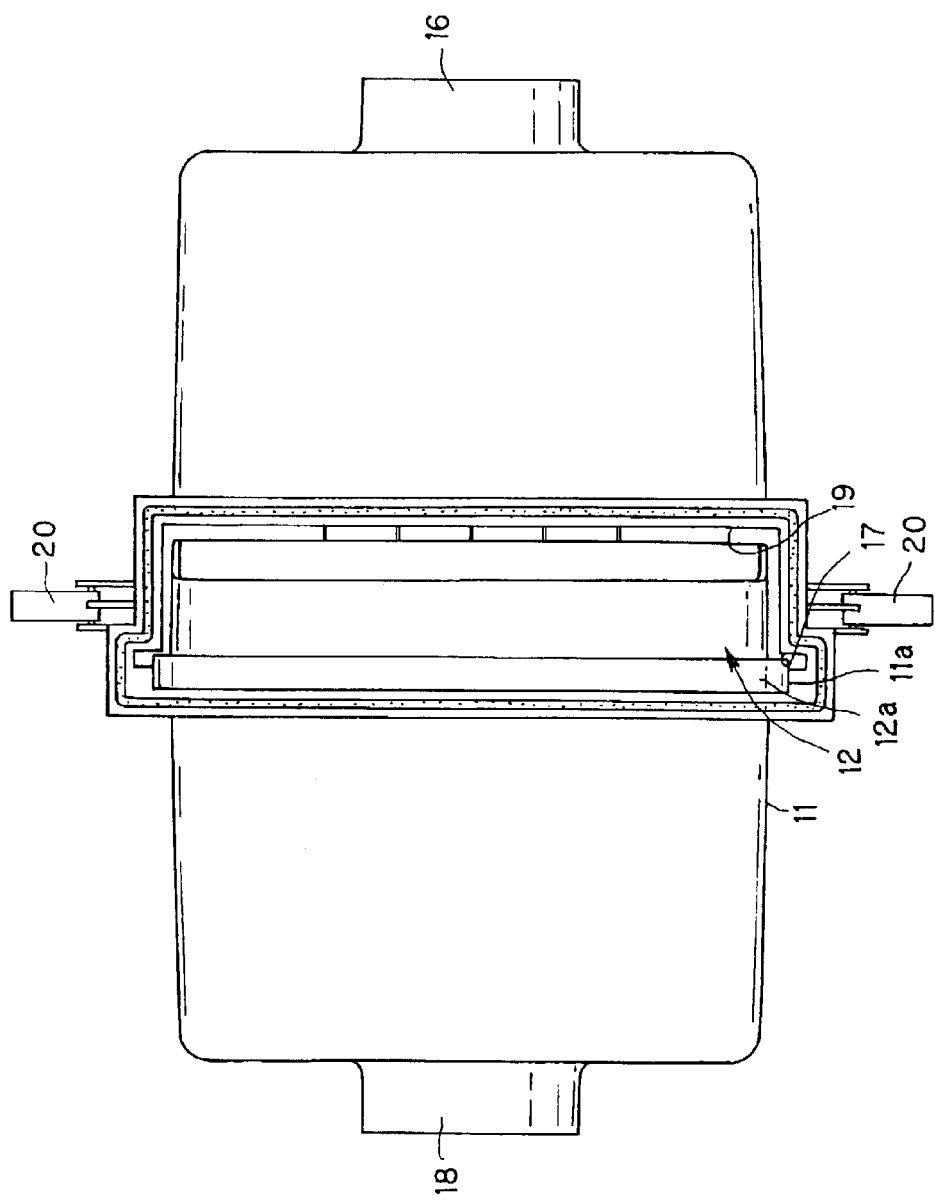
FIG. 9 is a plan view showing a state that the filter element is fitted to the case.

With reference to FIG. 9, showing the inserted state of the filter element 12 into the case 11.

The width side portion of the opening 11a of the case 11 is formed with the stepped portion 17 so as to surround the flange 12a. This stepped portion 17 acts to guide the flange 12a of the filter element 12 inserted through the opening 11a of the case 11 and also acts to position the filter element 12 with respect to the case 11 in the air passing direction.

Figure 10:
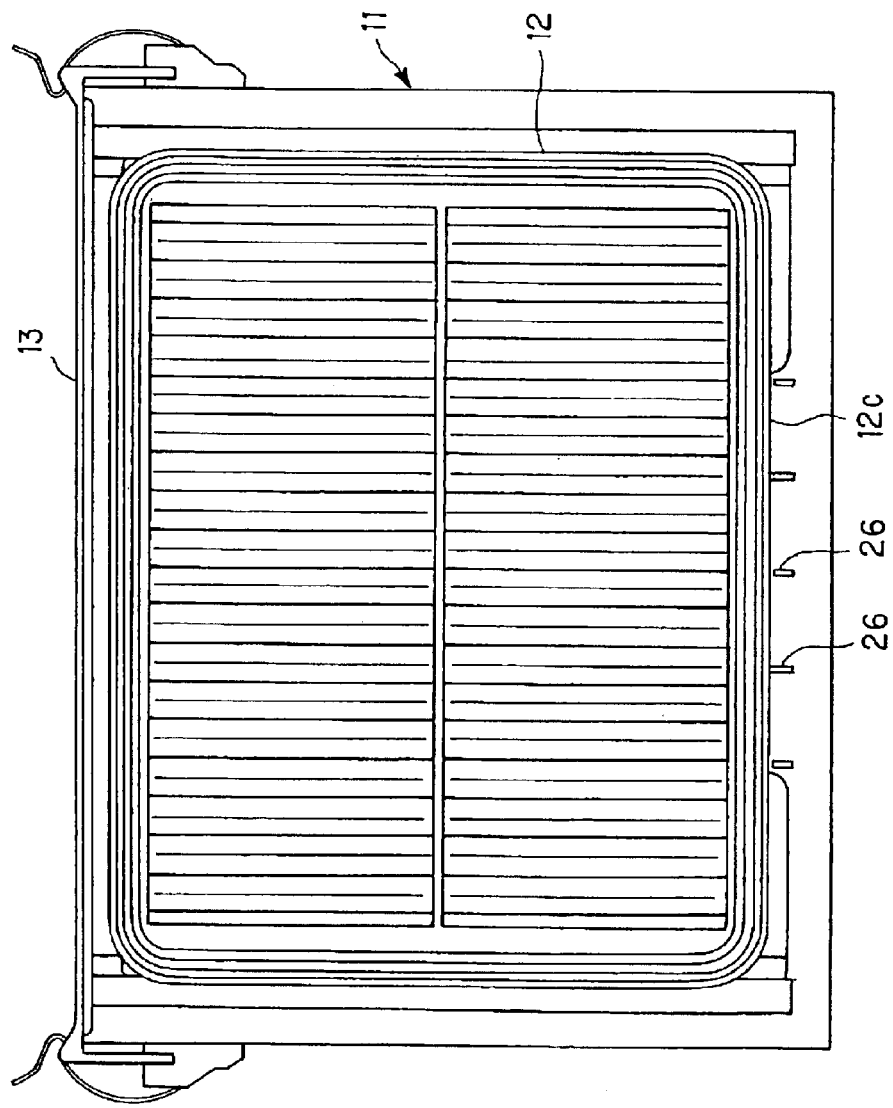
FIG. 10 is a front view showing a state that the filter element and the holder are fitted to the case.

FIG. 10 is the sectional view showing a state that the filter element 12 and the holder 13 are inserted into the case 11. The case 11 is provided with a plurality of positioning ribs 26, 26, - - - for positioning the filter element 12 in the filter element inserting direction and preventing one side 12c of a frame of the filter element 12 from entirely contacting the case 11. In the illustrated embodiment, the construction is made such that five ribs 26 are formed and two tall positioning ribs 26, 26 act to position the filter element 12 and other three short positioning ribs 26, 26, 26 act to position the holder 13.

Figure 11:
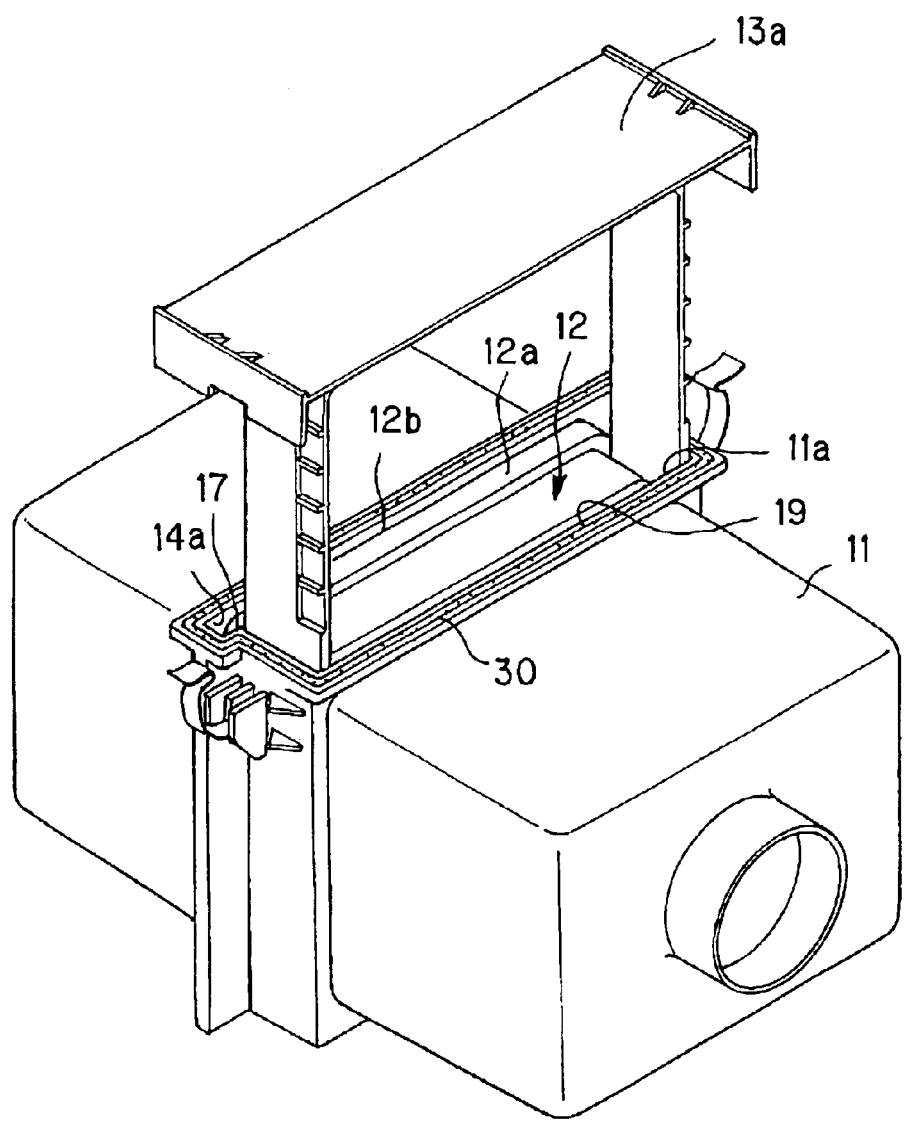
FIG. 11 is a perspective view showing an assembling state of the air cleaner.

The air cleaner assembling method will be explained hereunder with reference to FIGS. 11 to 13.

The filter element 12 is first inserted into the case 11 through the opening 11a, and at this insertion time, the sliding motion of the flange 12a of the filter element 12 is guided between the abutment surface 14a of the case 11 and the stepped portion 17. The filter element 12, which has been completely inserted into the case 11, is almost positioned in the air flow direction, as well as the filter element insertion direction. In this inserting operation, the construction is made such that the filter element 12 is slightly moved in the air flow direction so that the seal portion 12b of the filter element 12 contacts the abutment surface 14a. Next, the holder 13 is inserted into the case 11 through the opening 11a along the holder guide surface 19 of the case 11.

Figure 12:
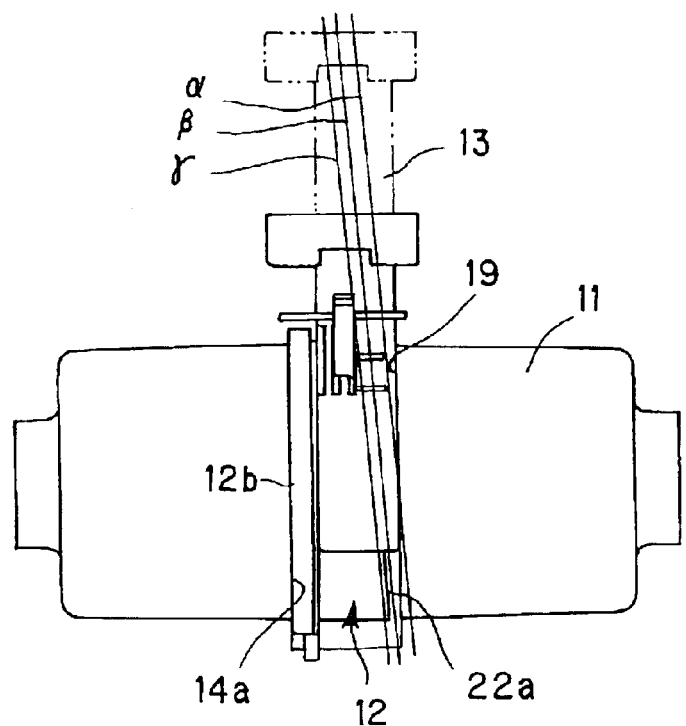
FIG. 12 is a side view showing a wedge inclination surface at the time of inserting the holder.

With reference to FIG. 12 showing the position of the wedge portion inclination surface 24 of the holder 13 at the holder insertion step, the symbol $\alpha$ represents a position of the inclination surface 24 at the initial insertion period, the symbol $\beta$ represents a position thereof at an intermediate insertion period and the symbol $\gamma$ represents the final inclination surface position of the wedge portion at the time when the holder 13 has been completely inserted.

When the wedge portion inclination surface 24 formed on the holder 13 and the frame inclination surface 22a formed on the filter element 12 are contacted, the filter element 12 is pressed towards the abutment surface 14a of the case 11 and, finally, the seal portion 12b of the filter element 12 contacts the abutment surface 14a, thereby sealing the clean side of the air cleaner.

According to this embodiment, as mentioned above, the sealing condition between the filter element 12 and the case 11 can be surely maintained by first positioning the filter element 12 inserted into the case 11 and, thereafter, contacting the seal portion 12b of the filter element 12 with the abutment surface 14a of the case 11 by inserting the holder 13.

On the contrary, if the filter element and the holder are constructed to be inserted together into the case, the seal portion of the filter element slides while contacting the abutment surface of the case. Therefore, in an adverse case, the seal portion maybe curled inward. Moreover, even if the filter element is first inserted, the filter element may have a large play in the case 11, and in such case, the smooth insertion of the holder will not be expected.

Figure 13:
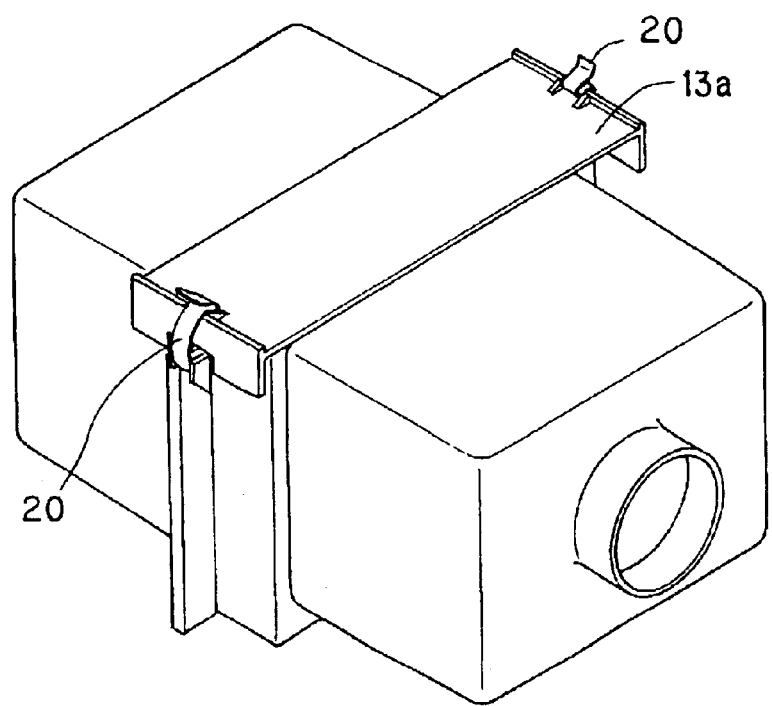
FIG. 13 is a perspective view showing the air cleaner to which the holder is fitted.

With reference to FIG. 13, the lid portion 13a of the holder 13 inserted into the case 11 is fixed by fixing fittings 20, 20 attached to the case 11. A packing 30 (FIG. 11) is applied to the entire edge portion of the opening 11a of the case 11, and by deforming this packing 30, the invasion of water inside the air cleaner can be prevented.

Figure 14:
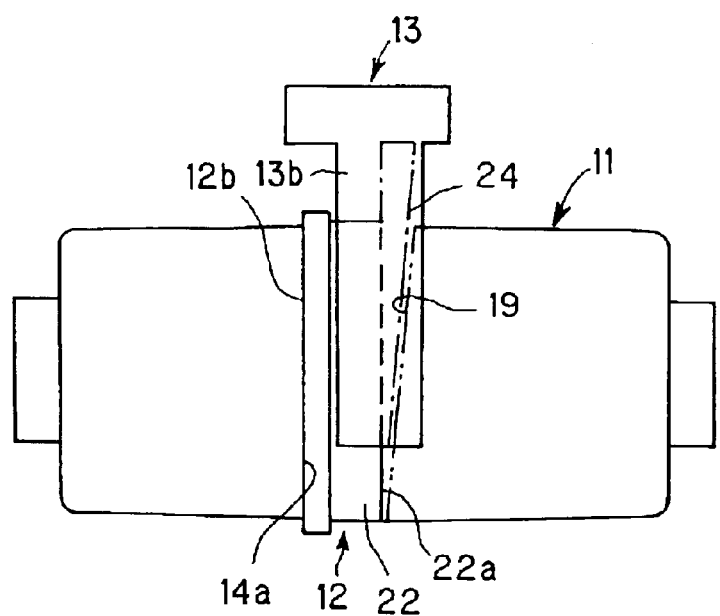
FIG. 14 is a side view showing an arrangement of another example of the filter element, the holder and the case.

FIG. 14 represents another example of the filter element 12, the holder 13 and the case 11 according to the present invention. In the embodiment described above, the guide surface 19 is formed on the case 11 to be parallel to the abutment surface 14a, the wedge portion inclination surface 24 is also formed on the holder 13 so as to incline with respect to the holder guide surface 19, and the frame inclination surface 22a inclining with respect to the seal portion 12b is formed on the filter element 12. However, the present invention is not limited to such embodiment and other modification may be adopted as far as the seal portion 12b of the filter element 12 can be contacted with the abutment surface 14a of the case by the holder 13 which is inserted after the insertion of the filter element 12.

For example, in the example of FIG. 14, end surfaces 22a are formed, to be parallel to the seal portion 12b, to the frame 22 surrounding the filter element 12. The holder guide surface 19 is formed on the case 11 so as to incline with respect to the abutment surface 14a so as to approach the abutment surface 14a towards the inside of the case 11 through the opening 11a thereof.

The wedge portion 13b of the holder 13 is formed with the wedged portion inclination surface 24 inclining with respect to the abutment surface 14a of the case 11 so as to approach the abutment surface 14a of the case towards the inside of the case through the case opening 11a. When the inclination surface 24 of the holder 13 contacts the holder guide surface 19 of the case 11a, the seal portion 12b of the filter element 12 contacts the abutment surface 14a of the case 11.

Figure 15:
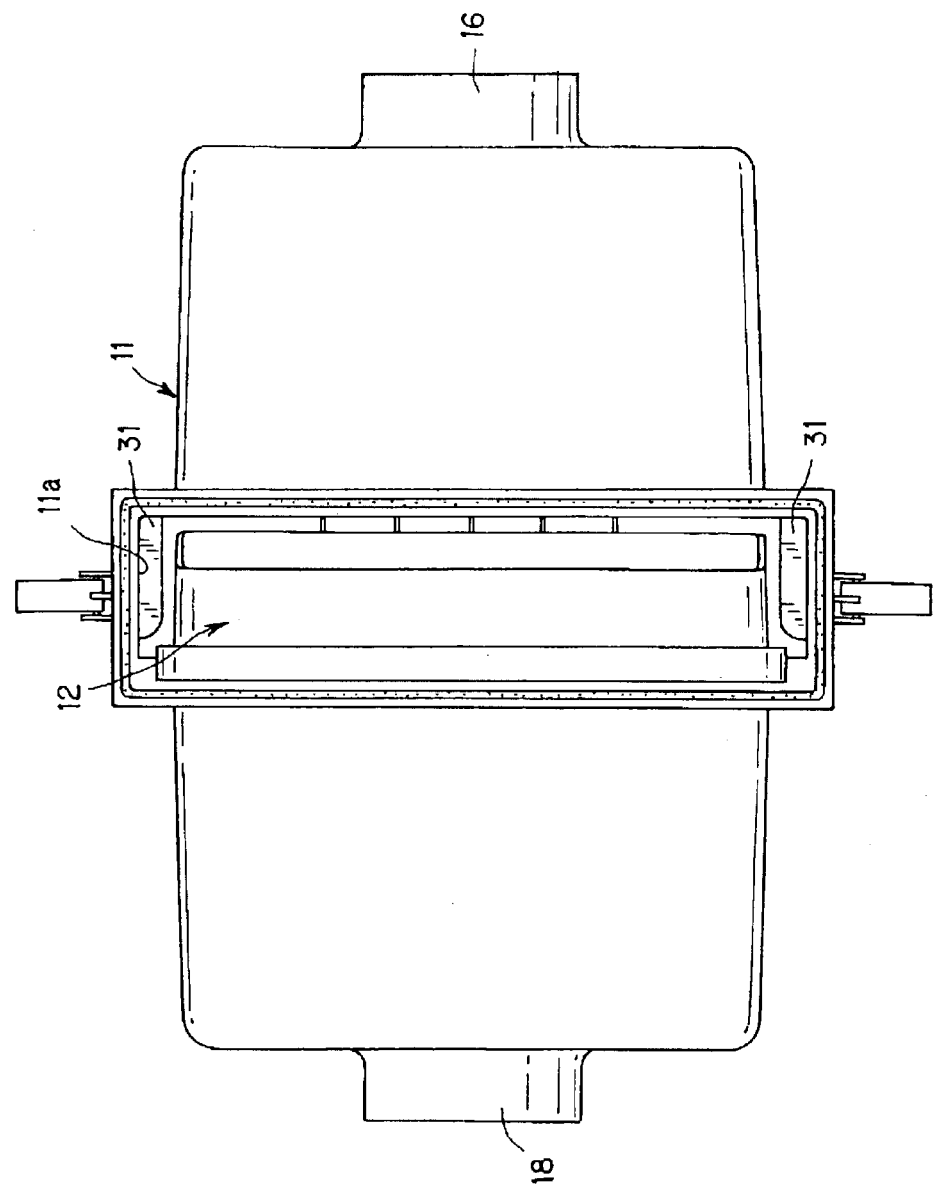
FIG. 15 is a plan view showing another example of a guide portion for slidably guiding the filter element.
Figure 16:
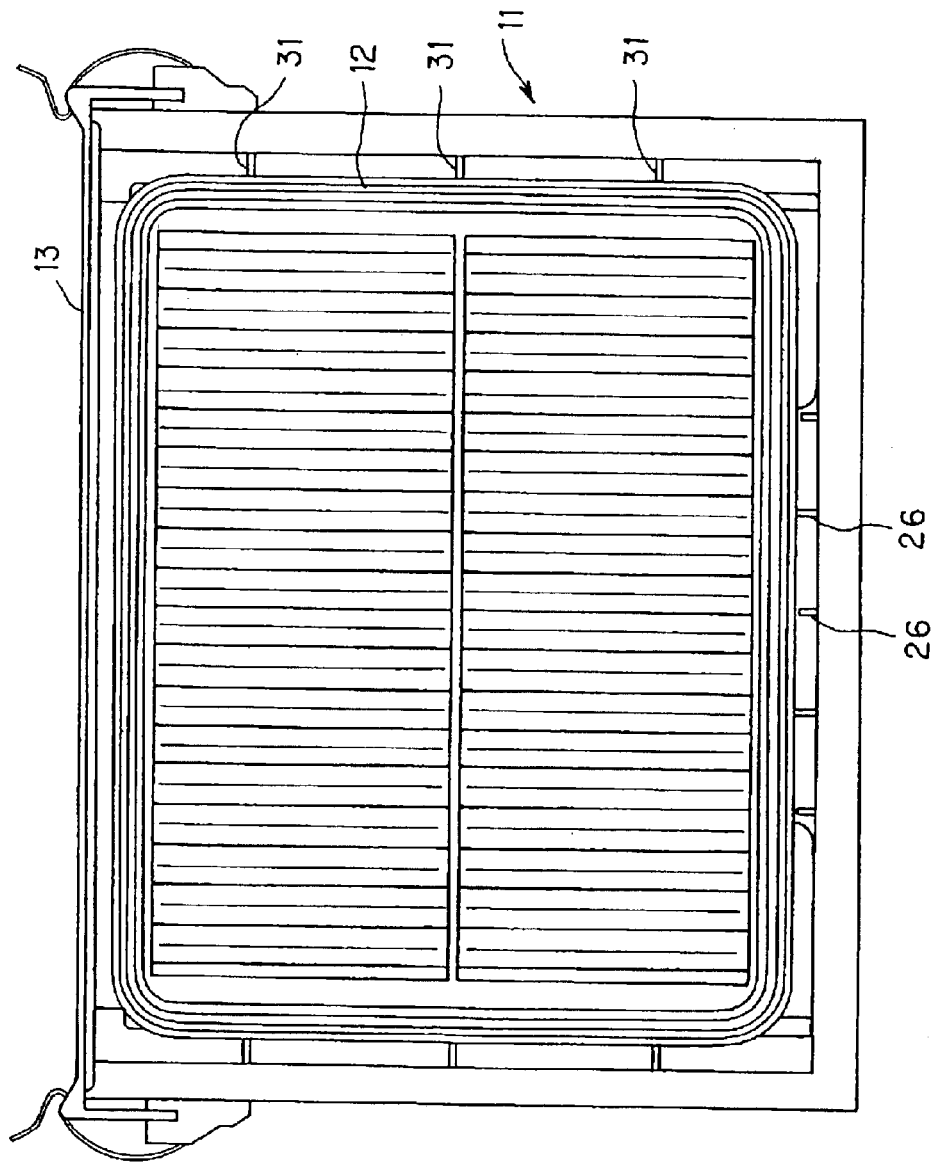
FIG. 16 is a front view showing another example of a guide portion for slidably guiding the filter element.

FIGS. 15 and 16 show an example of the guide portion guiding the filter element 12 to be slidable. In this example, the opening 11a of the case has a rectangular shape in the plan view, and a plurality of ribs 31, 31, - - - are arranged in the case 11 with a certain interval from each other in the filter element insertion direction. These ribs 31, 31, - - - may act as the guide portion.

Figure 17:
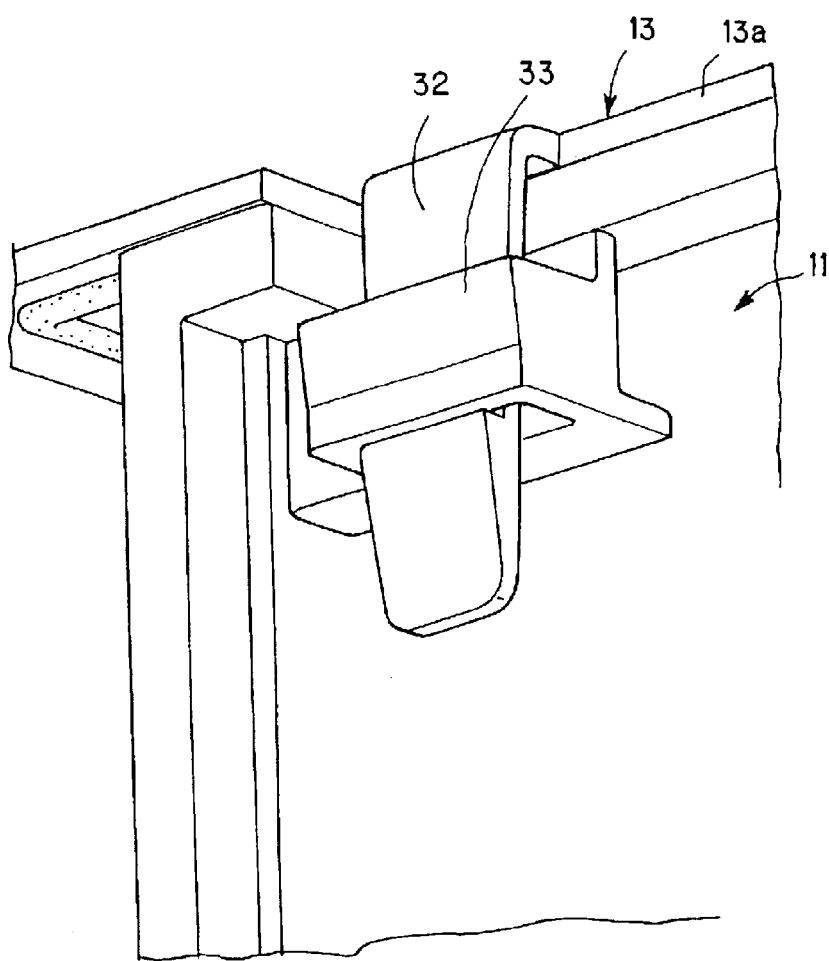
FIG. 17 is an enlarged partial view showing a fastening condition of the case and the holder.
Figure 18:
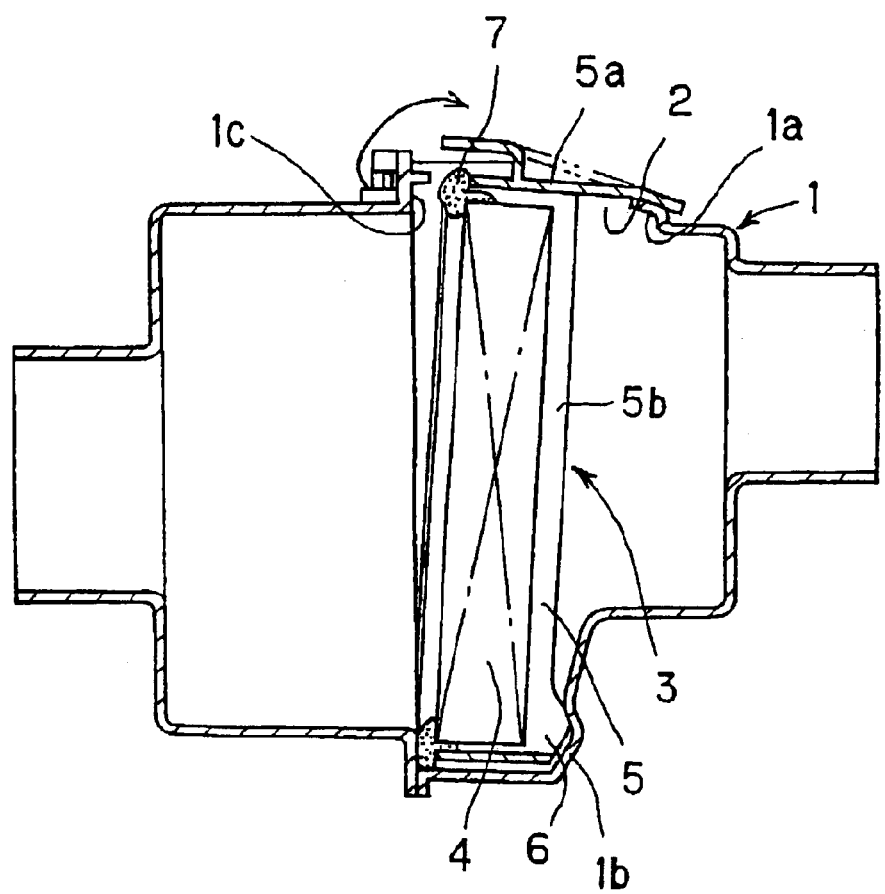
FIG. 18 is a sectional view showing a conventional structure of an air cleaner.

FIG. 17 shows another example for fastening the holder 13 and the case 11. In this example, the lid portion 13a of the holder 13 is provided with a snap hook 32 folded and bent towards the case side. According to the structure of this example, the front end of the snap hook 32 acts as a spring to be engaged with an engagement portion 33 formed on the case, thereby fixing the holder 13 to the case 11.

As mentioned hereinbefore, according to the present invention, it is possible to position the filter element by first inserting it into the case, and the holder is thereafter mounted to the case so as to contact the seal portion of the filter element with the abutment surface of the case. Therefore, the sealing performance between the filter element and the case can be maintained in good state.

Further, it is to be noted that the present invention is not limited to the described embodiment and many other changes and modifications may be made without departing from the scopes of the appended claims.

What is claimed is:

1. An air cleaner comprising:
   a filter element, for filtrating air, including a frame structure, a filtrating member disposed in the frame structure, a flanged portion protruding from the outside of the frame structure and a seal portion;
   a case provided with an air passage through which air passes and an opening through which said filter element is inserted into the case and having an abutment surface around the air passage to which the seal portion of the filter element contacts, said case being further provided with a guide portion for guiding the flanged portion of the filter element when inserted into the case through the opening and positioning the filter element in the air flow direction with respect to the case; and
   a holder provided with a lid portion closing the opening of the case when fitted to the case and a wedge-shaped portion to be inserted between the case and the filter element,
   wherein said filter element is first inserted into the case through the opening thereof and said holder is thereafter fitted into the case through the opening so as to contact the seal portion of the filter element to the abutment surface of the case.

2. An air cleaner according to claim 1, wherein said guide portion is provided with a stepped portion formed on the opening of the case so as to surround the flanged portion of the filter element, said stepped portion extending in a filter element inserting direction from said opening towards an interior of the case.

3. An air cleaner according to claim 1, wherein said opening has a rectangular shape and said guide portion comprises a plurality of ribs arranged inside the case along a filter element inserting direction.

4. An air cleaner according to claim 1, wherein positioning ribs are provided with the case to position the filter element, when inserted into the case through the opening, in the filter element inserting direction and to prevent an entire length portion of one side of the outer frame of the filter element from contacting to the case.

5. An air cleaner according to claim 1, wherein the frame structure of said filter element is formed with an inclination surface inclining with respect to the seal portion so as to be apart from the seal portion towards the inside of the case from the opening thereof, said case is formed with a holder guide surface to be parallel to the abutment surface of the case, the wedge-shaped portion of said holder is formed with an inclination surface inclining with respect to the holder guide surface so as to approach the holder guide surface towards the inside of the case from the opening, and said seal portion of the filter element abuts against the abutment surface of the case by contact of the inclination surface of the wedge-shaped portion of the holder with the inclination surface of the frame structure of the filter element.

6. An air cleaner according to claim 1, wherein said frame structure of the filter element is formed with an end surface in parallel to the seal portion of the filter element, said case is formed with a holder guide surface inclining with respect to the abutment surface so as to approach the abutment surface towards the inside of the case from the opening thereof, said wedge-shaped portion of the holder is formed with an inclination surface inclining with respect to the abutment surface of the case so as to approach the abutment surface towards the inside of the case from the opening, and said seal portion of the filter element abuts against the abutment surface of the case in contact of the inclination surface of the wedge-shaped portion of the holder to the holder guide surface of the case.

7. An air cleaner according to claim 1, wherein said case is composed of two case half parts, each in shape of an opened box, which are joined to form the case, said opening being formed at the joining portion and said case half parts being provided with air flow-in port and air flow-out port, respectively, so that air flows in a direction substantially normal to the filter element insertion direction.

8. An air cleaner according to claim 7, wherein said abutment surface is formed on an opened end surface of one of said two half case parts in a flanged frame shape so as to surround the air passage in the case.

9. An air cleaner according to claim 1, wherein said wedge-shaped portion of the holder comprises a pair of wedge sections and a plate member connecting edge portions of the paired wedge sections.

10. An air cleaner according to claim 2, wherein positioning ribs are provided with the case to position the filter element, when inserted into the case through the opening, in the filter element inserting direction and to prevent an entire length portion of one side of the outer frame of the filter element from contacting to the case.

11. An air cleaner according to claim 3, wherein positioning ribs are provided with the case to position the filter element, when inserted into the case through the opening, in the filter element inserting direction and to prevent an entire length portion of one side of the outer frame of the filter element from contacting to the case.

12. An air cleaner according to claim 2, wherein the frame structure of said filter element is formed with an inclination surface inclining with respect to the seal portion so as to be apart from the seal portion towards the inside of the case from the opening thereof, said case is formed with a holder guide surface to be parallel to the abutment surface of the case, the wedge-shaped portion of said holder is formed with an inclination surface inclining with respect to the holder guide surface so as to approach the holder guide surface towards the inside of the case from the opening, and said seal portion of the filter element abuts against the abutment surface of the case by contact of the inclination surface of the wedge-shaped portion of the holder with the inclination surface of the frame structure of the filter element.

13. An air cleaner according to claim 3, wherein the frame structure of said filter element is formed with an inclination surface inclining with respect to the seal portion so as to be apart from the seal portion towards the inside of the case from the opening thereof, said case is formed with a holder guide surface to be parallel to the abutment surface of the case, the wedge-shaped portion of said holder is formed with an inclination surface inclining with respect to the holder guide surface so as to approach the holder guide surface towards the inside of the case from the opening, and said seal portion of the filter element abuts against the abutment surface of the case by contact of the inclination surface of the wedge-shaped portion of the holder with the inclination surface of the frame structure of the filter element.

14. An air cleaner according to claim 2, wherein said frame structure of the filter element is formed with an end surface in parallel to the seal portion of the filter element, said case is formed with a holder guide surface inclining with respect to the abutment surface so as to approach the abutment surface towards the inside of the case from the opening thereof, said wedge-shaped portion of the holder is formed with an inclination surface inclining with respect to the abutment surface of the case so as to approach the abutment surface towards the inside of the case from the opening, and said seal portion of the filter element abuts against the abutment surface of the case in contact of the inclination surface of the wedge-shaped portion of the holder to the holder guide surface of the case.

15. An air cleaner according to claim 3, wherein said frame structure of the filter element is formed with an end surface in parallel to the seal portion of the filter element, said case is formed with a holder guide surface inclining with respect to the abutment surface so as to approach the abutment surface towards the inside of the case from the opening thereof, said wedge-shaped portion of the holder is formed with an inclination surface inclining with respect to the abutment surface of the case so as to approach the abutment surface towards the inside of the case from the opening, and said seal portion of the filter element abuts against the abutment surface of the case in contact of the inclination surface of the wedge-shaped portion of the older to the holder guide surface of the case.

16. An air cleaner according to claim 2, wherein said wedge-shaped portion of the holder comprises a pair of wedge sections and a plate member connecting edge portions of the paired wedge sections.

17. An air cleaner according to claim 3, wherein said wedge-shaped portion of the holder comprises a pair of wedge sections and a plate member connecting edge portions of the paired wedge sections.

* * * * *